(12) United States Patent
Bartholomä

(10) Patent No.: US 6,409,223 B1
(45) Date of Patent: Jun. 25, 2002

(54) CORRUGATED HOSE WITH A HOLDER

(75) Inventor: Mario Bartholomä, Winden (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 0 days.

(21) Appl. No.: 09/579,052

(22) Filed: May 26, 2000

(30) Foreign Application Priority Data

Jun. 4, 1999 (DE) .................... 299 09 715 U

(51) Int. Cl.$^7$ .............. F16L 27/10; F16L 55/00
(52) U.S. Cl. .............. 285/114; 285/227; 285/903
(58) Field of Search .............. 285/64, 114, 226, 285/227, 903

(56) References Cited

U.S. PATENT DOCUMENTS

| | | | | |
|---|---|---|---|---|
| 2,461,427 A | * | 2/1949 | Kneebone | 285/114 X |
| 3,211,473 A | * | 10/1965 | Schmid | 285/114 |
| 4,318,519 A | | 3/1982 | Blevins | |
| 4,340,244 A | * | 7/1982 | Scott | 285/114 |
| 4,376,549 A | * | 3/1983 | Cole | 285/114 |
| 4,791,963 A | * | 12/1988 | Gronert et al. | 285/114 X |
| 4,922,554 A | | 5/1990 | Hwang | |

FOREIGN PATENT DOCUMENTS

| | | |
|---|---|---|
| DE | 29810441 U1 | 9/1998 |
| EP | 0575218 A1 | 12/1993 |
| JP | 07285245 | 5/1997 |

* cited by examiner

*Primary Examiner*—Neill Wilson
(74) *Attorney, Agent, or Firm*—Volpe and Koenig, P.C.

(57) ABSTRACT

A corrugated hose (2) has a holder (1) to releasably fix the corrugated hose (2) in an angled or curved position in relation to a lengthwise projection of the inner tube, whereby the holder (1) fits snugly into at least one recess or corrugation valley (4) of the corrugated hose (2). The holder has two legs (5, 6), and the legs (5, 6) can snugly fit the corrugated hose (2) which curves between the two legs (5, 6) in a position ready for use. At least one of the snug fits is made with a cut-out (8) open at the side in which the corrugated tube (2) can be inserted from the side under elastic deformation (FIG. 1).

12 Claims, 4 Drawing Sheets

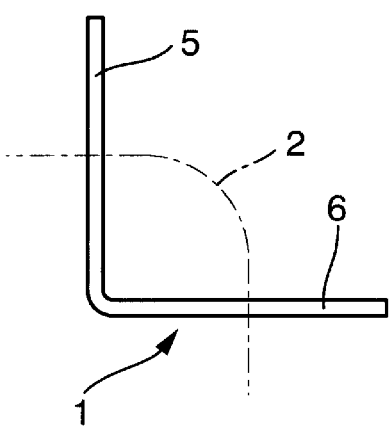
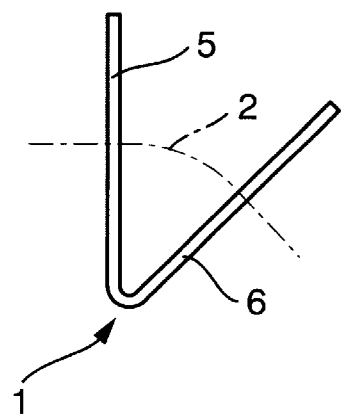
Fig. 8                     Fig. 9
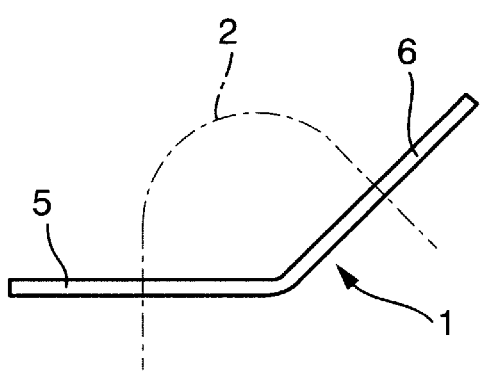
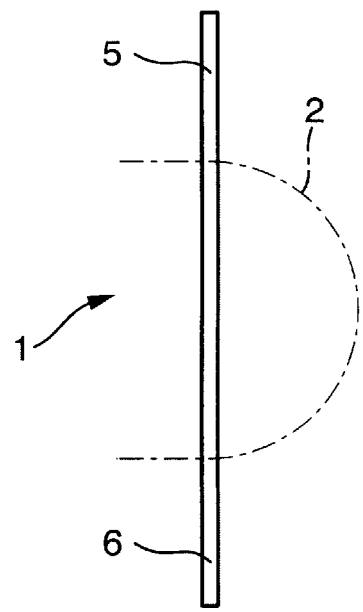
Fig. 10                    Fig. 11

CORRUGATED HOSE WITH A HOLDER

BACKGROUND

The invention concerns a corrugated hose with a holder to fix the corrugated hose in a position that is angled in relation to the lengthwise projection of the inner tube, whereby the holder fits tightly into at least one recess between axially adjacent corrugations of the corrugated hose.

Such a prior-art corrugated hose with a holder that has proven useful is in DE GM 298 10 441.5 U. The corrugated hose is held by an angled holder in a recess close to its end. The angled position of the lengthwise projection of the inner tube is in the angled holder and not in the corrugated tube itself. This arrangement is hence suitable only where a corrugated tube runs parallel to a housing wall, etc. into which the lengthwise inner tube is guided through a hold.

The arrangement is unsuitable when it is desirable for the corrugated tube to change direction. In this case, several holders must be provided to hold the corrugated tube before and after such a change in direction. A corresponding number of mounting sites are required for the holders.

The invention is therefore based on the problem of creating a corrugated hose with a holder whereby the corrugated hose can be releasably held when the direction changes even when there is only one attachment site for the holder, and the corrugated hose is to curve or change direction at a distance from this site. Likewise it should also be possible to first fix a corrugated tube with its holder to a hole into a housing with the hose first leading away from the hole and then running parallel or at a different angle to the housing surface via a curve.

SUMMARY

To solve this problem, the cited corrugated tube is characterized by a holder that has at least two legs, and the legs are designed to tightly fit the corrugated hose and curve it between the two legs in a position ready for use. The corrugated hose can hence be given a curve in its path that can be fixed by the tight connection to the two legs that form or belong to the holder. The hollow lengthwise interior of the corrugated tube can hence change direction by holding it in a curve and not by a separate extension such as an elbow, etc. without having to install several holders.

It is useful when the holder is an angled piece with two legs that meet at an acute, right or obtuse angle up to 180°. This allows curves of any length to be fixed with a corresponding directional change of the corrugated hose. U-shaped curves and hence 180° directional changes can be created when the two legs are at an angle of 180° to each other. If they are at an obtuse or right angle, a greater directional change can be attained if the corrugated hose is run from the outside of the angled piece and then fixed to the two legs.

A particularly simple embodiment of the holder results when the legs have at least one cut-out, hole or penetration to form a tight fit with the corrugated hose. When the hole is closed, the face of a corrugated hose can e.g. be provided with a corresponding coupling or clamp.

It is particularly favorable for at least one of the legs or both legs to have at least one cut-out that is open on the side so that a recess of the corrugated hose can be shoved into the cut-out from the side. The side opening of the cut-out is smaller than the outer diameter of the corrugated tube in a corrugation valley, and the thickness of the holder at the area of the cut-out is the same or less than the axial dimension of a corrugation valley or a recess between two corrugations. This makes it possible to press in the corrugated hose from the side into a corresponding cut-out. A corrugation valley or recess comes to lie in the cut-out, and a strain relief is also provided by the corrugations to either side. Since the corrugated hose is shoved into the cut-out from the side, it is tightly held without any additional installation effort being required. Installation is correspondingly easy especially when there is at least one cut-out with a side opening in each leg of the angled holder, i.e., the corrugated hose can be mounted in both legs in the same easy way. If one of the cut-outs is a closed hole with a continuous edge, the end of the corrugated hose can be fixed with a clamp, e.g. while simultaneously fixing it to a hole in the wall of a housing so that the corrugated hose can run in the correspondingly desired direction proceeding from the top of the housing via a curve and then through the second leg.

The width of the side opening of the cut-out serving to clamp the corrugated hose can be slightly smaller than the outer diameter of the corrugated hose in a corrugation valley so that the diameter of the corrugated hose is compressed by this amount against the elasticity of the material. The corrugated hose can hence be easily introduced from the side into the cut-out by squeezing it slightly, and it fits snugly due to the restoring force of the material elasticity. It can also be easy removed in like manner.

The diameter of the cut-out(s) can approximately correspond to the outer diameter of the corrugated hose at the corrugation valleys. Practically all of the recess or corrugation valley of the corrugated hose can be grasped by the inner edge of the cut-out when installed, and this produces a tight fit.

It is useful when an insertion funnel is provided before the opening in the insertion direction for the corrugated hose into the recess with the side opening, and the funnel leads from the outer edge of the leg to the opening. This makes it easier for the user to insert the corrugated hose from the side into the cut-out, and the corrugated hose is nearly automatically compressed radially in this area by the insertion funnel.

In one embodiment of the invention, both legs of the holder have two cut-outs with and/or without a side opening. The holder is then suitable to simultaneously hold two corrugated hoses or one hose in different positions.

It is particularly desirable when the holder is made of sheet metal and especially sheet steel. It can then be very economical to make practically out of a single piece where the thickness can correspond to the axial dimension of a corrugated valley by selecting a corresponding type of sheet metal.

The angle between the two legs of the holder can be adjustable, particularly by bending when the two connected angled legs are made of a single piece. Accordingly, the angled position of the two legs can be adapted to a special path of the corrugated hose as needed if this path deviates from the path set by the respective angle between the two legs.

At least one of the angled legs can be flat over at least a part of its surface, and this flat area can serve as an attachment site to anchor the holder to a wall or housing surface. This gives the angled leg an additional function, and it is not necessary to provide additional anchoring projections or flanges, etc. on the holder. At least one of the legs (preferably both legs) can have at least one hole, screw opening, or a similar deformation to anchor the holder. In addition to the cut-outs to receive the corrugated hose, one additional hole is sufficient to make the holder functional.

The legs of the holder can be different lengths and, in particular, the leg with a cut-out with a side opening can be longer than the other leg. If for example one leg has a closed cut-out for attaching a line insert or clamp to the end of a corrugated hose, the corrugated hose can be first attached tightly in the holder. It is then bent so that it can be shoved in the side opening of the cut-out of the second angled leg. It is useful if the leg with the cut-out open at the side is somewhat longer since the line insert or clamp takes up a certain amount of space and the corrugated hose cannot bend in this area.

Above all when some or several of the described features and measures are combined, a corrugated hose with a holder results that is very easy to fix and mount in a curved position either to wall holes or housing openings or at a different place in the path of the hose.

BRIEF DESCRIPTION OF THE DRAWINGS

In the following, exemplary embodiments of the invention will be further explained with reference to the drawing. The following figures are shown, some with schematic representations.

DETAILED DESCRIPTION OF THE PREFERRED EMBODIMENTS

Figure 1:
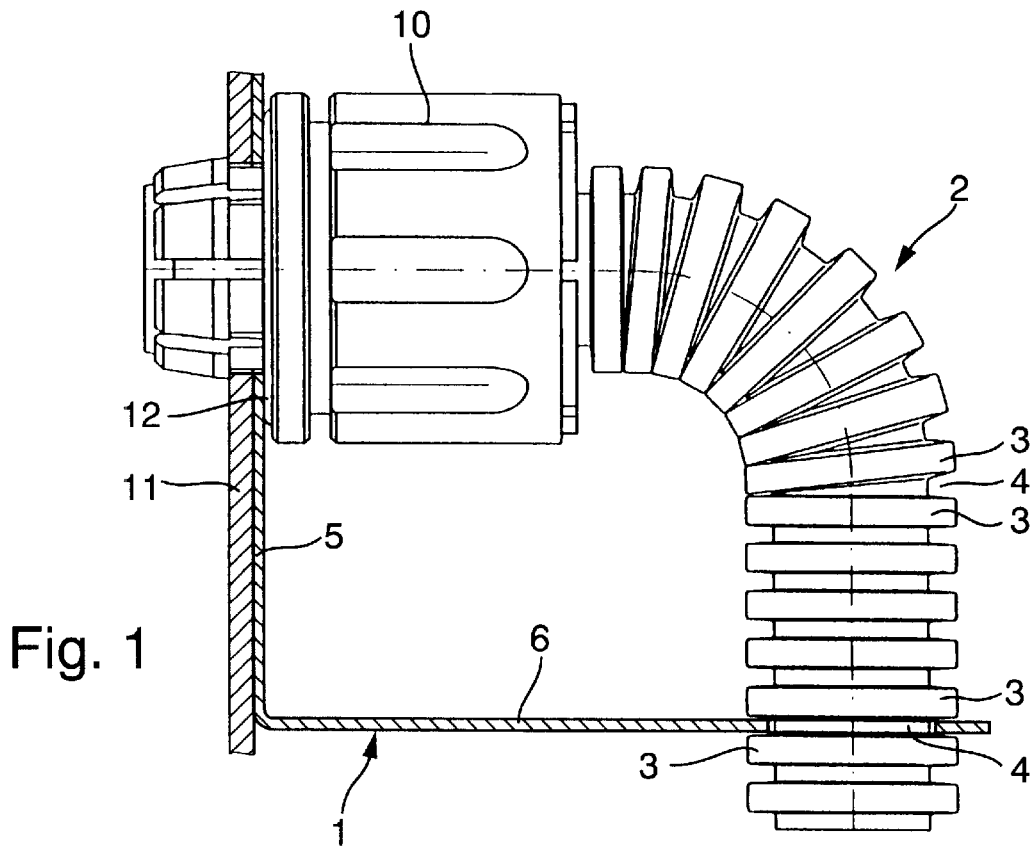
FIG. 1 A side view of a corrugated hose with a holder in a lengthwise section in relation to the holder. One end of the corrugated hose is affixed and sealed with a screwed clamp to the holder and a wall against which the leg of the holder rests, FIG. 2 A schematic representation of the holder according to FIG. 1, FIG. 3 A representation corresponding to FIG. 1 in which the corrugated hose is not sealed in the area of the wall attachment or penetration, FIG. 4 The holder of the corrugated hose according to FIG. 3 where the angled holder has cut-outs in both angled legs with side openings for inserting the corrugated hose. The openings of cut-outs face the same side, FIG. 5 A holder according to FIG. 4 where the side openings of the recesses face the opposite sides, FIG. 6 A holder designed as an angled piece with two legs that each have to cut-outs to hold corrugated hoses. The cut-outs of one leg are closed, and the cut-outs of the other leg have openings that face different sides, FIG. 7 An embodiment approximately according to FIG. 6 in which all four cut-outs have openings to the side for holding corrugated hoses, and FIGS. 8–11 A schematized side view of four holders with different angles between legs. A right angle (FIG. 8), an acute angle (FIG. 9), an obtuse angle (FIG. 10) and an angle of 180° (FIG. 11) are shown.
Figure 3:
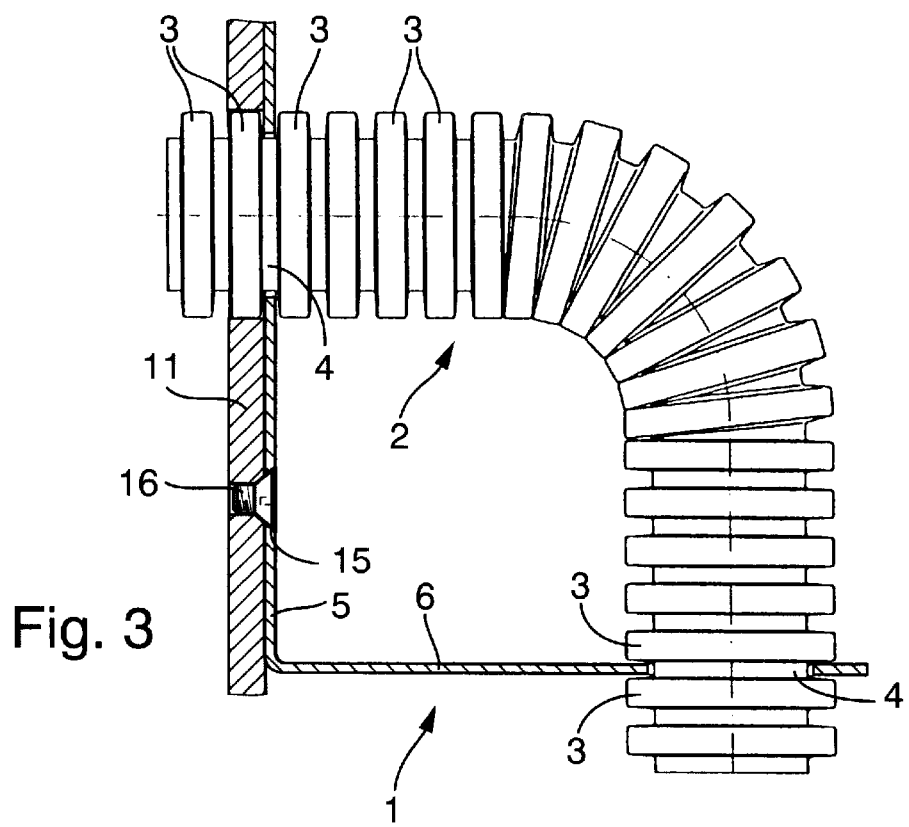
Figure 4:
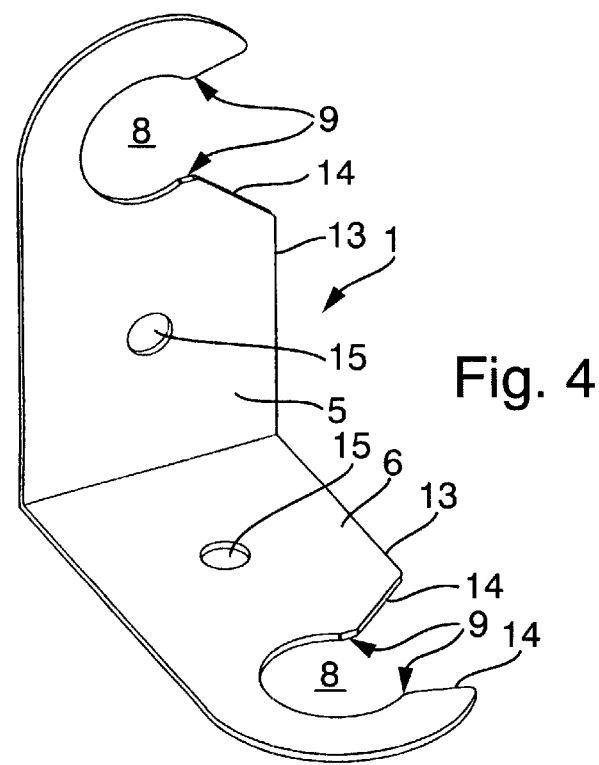
Figure 5:
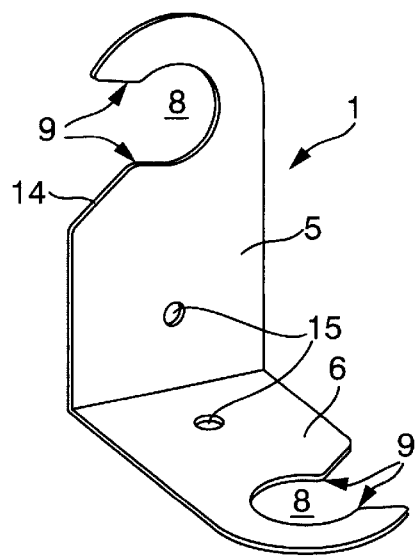

A holder 1 serves to hold a corrugated hose 2 in a position angled from a lengthwise projection of its inner tube where the holder 1 in FIGS. 1 and 3 tightly holds at least one recess 4. between axially adjacent corrugations 3 of the corrugated hose 2, i.e., in the corrugation valley of the corrugated hose 2.

In all the exemplary embodiments, one can see that each altered holder 1 has two legs 5 and 6. The legs 5 and 6 are designed to tightly hold the corrugated hose 2 as will be described. Accordingly, the corrugated hoses 2 in FIGS. 1, 3 and 3–11 have a more-or-less curved path in a position ready for use between the legs 5 and 6 which is permitted by the corrugated shape.

The holder 1 is designed as an angled piece with two legs 5 and 6 that can be in an acute angle as in FIG. 9, a right angle as in FIGS. 1–8, or an obtuse angle up to 180° as in FIGS. 10 and 11. FIG. 9 shows e.g. a 45° angle that accordingly changes the direction of the corrugated hose 2 by the same angle so that the two corrugated hose sections form an angle of 135° together. A holder 1 whose legs 5 and 6 in FIG. 10 form an angle of 135° produce a change in direction by this angle, i.e., the corrugated hose pieces together form a 45° angle.

Most frequently, a holder 1 has two legs 5 and 6 at a right angle to each other to change the direction of the corrugated hose by 90°. The corrugated hose can be rerouted 180° with two angled legs 5 and 6 that are 180° to each other, i.e., practically in a straight line as shown in FIG. 11.

Figure 2:
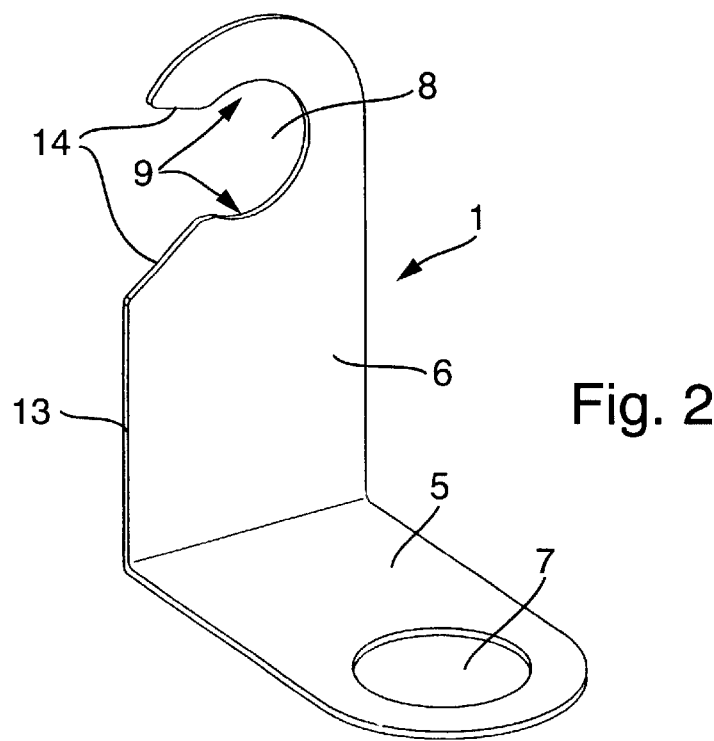

To tightly hold the corrugated hose 2, the legs 5 and 6 each have at least one cut-out 7 and 8 that can be a hole or any other penetration. In FIGS. 1 and 2, one of the legs, i.e., leg 6 can have a cut-out 8 that is open at the side (in FIGS. 3–5 both legs 5 and 6) to push in from the side the recess 4 of a corrugated hose 2. The side opening 9 of the respective cut-out 8 is slightly smaller than the outer diameter of the corrugated hose 2 in a corrugation valley or recess 4. In FIGS. 1 and 3, the thickness of the holder or its leg 6 is the same or less than the axial dimension of the recess 4 or corrugated valley in the area of the recess 8 between two corrugations 3. Accordingly, the corrugated hose 2 is fixed both laterally and axially to produce stress relief at both legs 5 and 6. The width of the side opening 9 can be slightly smaller than the outer diameter of the corrugated hose in a corrugation. valley 4 by the amount that the corrugated hose 2 or its material can be compressed toward its diameter against its elasticity or the elasticity of its material. Accordingly, the corrugated hose 2 can be compressed somewhat and then inserted into the cut-out 8 from the side at a recess 4 through the opening 9. Since the compression lies within the elasticity limit, it returns to its original position and is snug against all sides in the cut-out 8 despite the side opening 9. It can only be released and removed from this connection by being compressed in a radial direction.

The diameter of the cut-out 8 approximately corresponds to the outer diameter of the corrugated hose 2 in the area of its corrugated valleys 4.

FIGS. 1 and 2 show an exemplary embodiment in which one of the legs, i.e. the leg 5 of the holder 1 has a closed cut-out 7 to hold a line insert or clamp 10 grasping the end of the corrugated hose 2. This allows the hose to be simultaneously fixed to a wall 11. The clamp or screw connection 10 can also advantageously have a seal 12 so that the corresponding opening can be simultaneously sealed when the hose is attached to a wall 11.

In the insertion direction of the corrugated hose 2 from the side into the cut-out 8 with the side opening 9, there is an insertion funnel 14 in front of the opening that leads to the opening 9 from the outer edge 13 of the respective leg 5 and/or 6 in FIGS. 2 and 4–7. The insertion funnel makes insertion from the side easier and automatically radially compresses the corrugated hose 2 when installing it.

Figure 6:
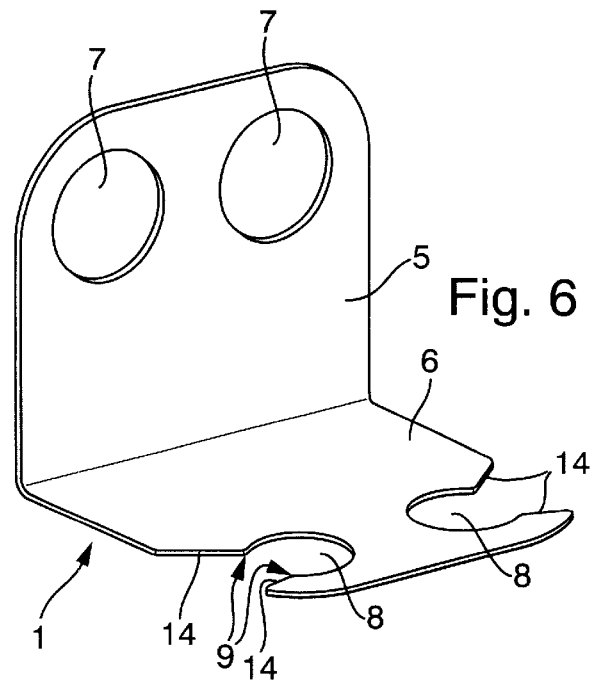
Figure 7:
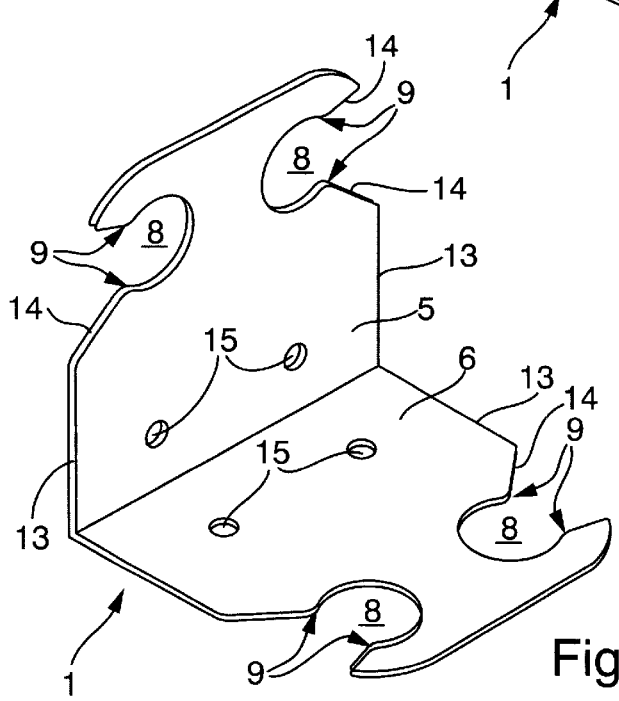

FIGS. 6 and 7 show exemplary embodiments where both legs 5 and 6 of the holder 1 each have two cut-outs 7 and/or 8 with and/or without a side opening 9. FIG. 6 shows an embodiment in which there are two closed cut-outs 7 in the leg 5, and two cut-outs 8 in leg 6 that have openings on opposite sides and insertion funnels 14.

In the embodiment in FIG. 7, all four cut-outs 8 in the legs 5 and 6 are open on opposite sides, i.e., they have side openings 9 and insertion funnels 14. Accordingly, two corrugated hoses 2 can be fixed parallel to each other, or a corrugated hose 2 can be selectively releasably fixed in different positions and even diagonally in this holder 1. "Diagonal" means that the cut-outs 7 and/or 8 closer to the opposing edges 13 are used to hold such a corrugated hose 2 and not the cut-outs that lie closest together.

In all the exemplary embodiments, the holder 1 is an angled piece of sheet metal, especially sheet steel. This makes it possible to adjust the angle between the two legs 5 and 6 of the holder by bending the angled legs 5 and 6 relative to each other at the joint of the single piece in all the exemplary embodiments.

Normally, the strength of the holder 1 is such that the legs cannot be bent in relation to each other, at least under normal pressure.

The surfaces of the angled legs 5 and 6 in the exemplary embodiments are flat, and this flat area in FIGS. 1 and 3 can be used and an attachment site for anchoring the holder 1 to the wall 11 or a housing surface. This can be done in FIG. 1 e.g. by gluing, soldering or welding.

In the exemplary embodiments in FIGS. 3–5 and 7, at least one of the legs 5 and/or 6 has at least one hole 15 or screw opening or a similar deformation to anchor the holder 1 e.g. with the aid of a fixing screw 16. This allows the holder 1 to be releasably fixed to a wall 11. In addition, the means of installation is particularly simple.

FIGS. 1 and 2 also show that legs 5 and 6 of the holder can have different lengths. In this exemplary embodiment, leg 6 with a cut-out 8 with a side opening 9 is longer than the other leg 5. The corrugated hose 2 can therefore not be bent over a portion of its length due to the screw clamp or clamp 10 so that the curve between the two legs 5 and 6 can only begin at a distance from leg 5. The greater length of leg 6 produces a section of the corrugated hose 2 that cannot be deformed due to the screw clamp or clamp 10.

In summary, a corrugated hose 2 results with a holder 1 that releasably holds the corrugated hose 2 in an angled or curved position in relation to a lengthwise projection of the inner tube. The holder 1 snugly grasps the recesses 4 (also termed corrugation valleys 4 above) of the corrugated hose 2. The holder 1 has two legs 5 and 6 that can snugly hold the corrugated hose 2 so that the hose has a curved path between the legs 5 and 6 when in a position ready for use. At least one of the snug connections is made using a cut-out 8 that is open on the side in which the corrugated hose can be inserted from the side under elastic deformation.

What is claimed is:

1. A corrugated hose with a holder to fix the corrugated hose (2) in a position that is angled in relation to a lengthwise projection thereof, whereby the holder (1) fits snugly into at least one recess (4) of the corrugated hose between axially adjacent corrugations (3) of the corrugated hose (2), comprising the holder (1) having at least two legs (5, 6) that tightly fit the corrugated hose (2) which curves between the two legs (5, 6) in a position for use, at least one of the legs (6) has at least one cut-out (8) that includes a side opening for inserting the recess (4) of the corrugated hose (2), whereby the side opening (9) of the cut-out (8) is smaller than an outer diameter of the corrugated hose in a corrugation valley (4), and a thickness of the holder (1) in an area of the cut-out (8) is the same or less than an axial dimension of the corrugation valley.

2. A corrugated hose with a holder according to claim 1, wherein the holder (1) is an angled piece with two legs (5, 6) that form an acute angle, right angle, or obtuse angle up to 180°.

3. A corrugated hose with a holder according to claim 1, wherein a width of the side opening (9) can be slightly smaller than the outer diameter of the corrugated hose in the corrugation valley (4) by an amount that the corrugated hose (2) can be diametrically compressed against an elasticity of a material used to form the hose.

4. A corrugated hose with a holder according to claim 1, wherein the cut-out (8) has a diameter that approximately corresponds to the outer diameter of the corrugated hose (2) in the area of the corrugation valley (4).

5. A corrugated hose with a holder according to claim 1, wherein one of the legs (5) of the holder (1) has at least one closed cut-out (7) to hold a line insert or clamp (10) connected to an end of the corrugated hose (2).

6. A corrugated hose with a holder according to claim 1, wherein in an insertion direction of the corrugated hose (2) into the cut-out (8) with the side opening (9), there is an insertion funnel (14) in front of the opening (9) that leads to the opening (9) from the outer edge (13) of the respective leg (5, 6).

7. A corrugated hose with a holder according to claim 1, wherein both of the legs (5, 6) of the holder (1) have an additional cut-out to provide at least two cut-outs (7, 8), at least one of the cut-outs including a side opening (9).

8. A corrugated hose with a holder according to claim 1, wherein the holder (1) is an angled piece consisting of sheet metal.

9. A corrugated hose with a holder according to claim 1, wherein the angle between the two legs (5, 6) of the holder (1) can be adjustable by bending when the two connected angled legs (5, 6) are made of a single piece.

10. A corrugated hose with a holder according to claim 1, wherein at least one of the angled legs (5, 6) has a flat area over at least a part of a surface thereof, and the flat area serves as an attachment site to anchor the holder (1) to a wall (11) or housing surface.

11. A corrugated hose with a holder according to claim 1, wherein at least one of the legs (5, 6) includes at least one hole (15), screw opening, or a similar deformation to anchor the holder (1).

12. A corrugated hose with a holder according to claim 1, wherein the legs (5, 6) of the holder (1) have different lengths, and the leg (6) with the cut-out (8) with the side opening (9) is longer than the other leg (5).

\* \* \* \* \*